United States Patent [19]

Curtis, Jr.

[11] 4,246,367

[45] Jan. 20, 1981

[54] DICYCLOPENTADIENE POLYESTER RESINS

[75] Inventor: Omer E. Curtis, Jr., Morristown, N.J.

[73] Assignee: United States Steel Corporation, Pittsburgh, Pa.

[21] Appl. No.: 78,342

[22] Filed: Sep. 24, 1979

Related U.S. Application Data

[60] Continuation-in-part of Ser. No. 967,328, Dec. 7, 1978, which is a division of Ser. No. 824,898, Aug. 15, 1977, abandoned, which is a continuation of Ser. No. 709,085, Jul. 27, 1976, abandoned.

[51] Int. Cl.$^3$ .................. C08G 63/76; C08L 67/04
[52] U.S. Cl. .................. 525/49; 428/482; 525/36; 525/40; 525/43; 528/298; 528/306
[58] Field of Search .................. 525/36, 40, 43, 49; 528/298, 306

[56] References Cited

U.S. PATENT DOCUMENTS

| | | | |
|---|---|---|---|
| 2,671,070 | 3/1954 | Knapp | 521/44 |
| 3,322,732 | 5/1967 | Tsuruta et al. | 528/298 |
| 3,530,202 | 9/1970 | Fekete et al. | 525/40 |
| 4,029,848 | 6/1977 | Nelson | 428/430 |

OTHER PUBLICATIONS

Smith et al., Proceedings of the 22nd Annual Technical Conference, SPI, Reinforced Plastics Division, Washington, D.C. (1967).

Zimmerman et al., Fette-Seifen-Antichmittel, 66 No. 9, (1974), pp. 670–678.

Nelson, "A Technical Report Describing Dicyclopentadiene Modified Polyesters", Dow Chemical Company, Freeport, Texas.

*Primary Examiner*—Lucille M. Phynes
*Attorney, Agent, or Firm*—William L. Krayer

[57] ABSTRACT

The invention disclosed is for a method of preparing unsaturated polyester resins containing high amounts of dicyclopentadiene. These polyester resins are useful in curable liquid compositions containing them together with a monomeric copolymerizable component. Such compositions may be used at ambient or elevated temperature, in casting, laminating or molding techniques known to the polyester resin art.

8 Claims, No Drawings

DICYCLOPENTADIENE POLYESTER RESINS

This is a continuation-in-part of my co-pending patent application Ser. No. 967,328, filed Dec. 7, 1978, which in turn is a division of my then co-pending application Ser. No. 824,898, filed Aug. 15, 1977, now abandoned, which in turn is a continuation of Ser. No. 709,085, filed July 27, 1976, now abandoned.

BACKGROUND OF THE INVENTION

This invention relates to a method for preparing new unsaturated polyester resins containing high amounts of dicyclopentadiene, the resultant resin product and also to curable liquid compositions containing said resins together with a monomeric copolymerizable component.

Cyclic structures in the alkyd portion of a polyester normally increase compatibility with styrene and provide rigidity and toughness in the cured resin. Low-cost phthalic anhydride is the most widely used cyclic polyester intermediate. Substitution of other cyclic intermediates for phthalic anhydride in a polyester formulation, however, often results in an improvement of one or more resin properties; for example, isophthalic acid polyesters have better resilience and corrosion resistance, and polyesters derived from certain bisphenol A derivatives have very superior corrosion resistance.

Dicyclopentadiene is a well-known, readily available raw material available from the petroleum industry.

Although dicyclopentadiene exists both as an endo and exo isomer, the commercial product is a liquid consisting principally of the endo form and contains a minimum of 90 weight percent available cyclopentadiene. Since dicyclopentadiene is very susceptible to peroxide formation upon contact with air, the commercial product is usually inhibited with p-tertiary butyl catechol.

Dicyclopentadiene is used principally as a source of cyclopentadiene, a highly reactive monomer, and being a conjugated diene, it readily undergoes the Diels-Alder reaction to form cyclohexene derivatives having a bridged ring or endomethylene group.

The following methods for incorporating dicyclopentadiene into a polyester are known. The anhydride method has been known wherein the preformed Diels-Alder adduct of cyclopentadiene and maleic anhydride is reacted with further amounts of maleic anhydride and a glycol in a polyesterification reaction at 200° C. Another method involves reacting a mixture of maleic anhydride, dicyclopentadiene and a glycol at 160° C.-180° C. followed by polyesterifying at 200° C.

Yet another known method consists of pre-reacting maleic anhydride and glycol at 160° C. to obtain an esteracid prior to reaction with dicyclopentadiene at 170°-175° C. and polyesterification at 200° C. A further known method involves polyesterification of maleic anhydride and a glycol at 200° C. followed by subsequent reaction with dicyclopentadiene at 160°-170° C.

Investigators have found using the above prior art methods that essentially two structurally different polyesters are formed, one containing groups (I) resulting from Diels-Alder reaction whereas the other contains ester and ether groups (II) resulting from acid or hydroxyl addition to one of the dicyclopentadiene double bonds.

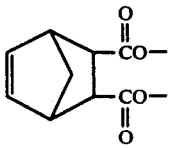 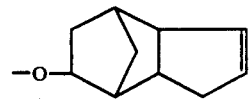

(I)  (II)

The polyesters of structure (II) have a higher activity relative to those of structure (I).

It has also been known to prepare thermosetting polyester compositions by mixing together a vinyl monomer such as, for example, styrene and an unsaturated polyester resin such as the prior art resins discussed above or those obtained by condensing maleic anhydride with a dihydric alcohol, such as ethylene glycol. The constituents of such compositions upon gentle heating and particularly in the presence of a peroxide or azo catalyst readily copolymerize or crosslink to infusible products that are substantially insoluble in many common organic solvents.

SUMMARY OF THE INVENTION

In the known prior art methods, there is a limitation on the amount of dicyclopentadiene that may be incorporated into the polyester. It has now been found that by practice of the present invention it is possible to react much higher amounts of dicyclopentadiene into the polyester and yet prepare a commercially acceptable product.

In the method of the present invention, maleic acid preferably generated by reaction of maleic anhydride with water, is reacted initially with the dicyclopentadiene. The reaction product of maleic acid and dicyclopentadiene is then reacted with the polyhydric alcohol to form the unsaturated polyester resin. The unsaturated polyester resin, when combined with the monomeric copolymerizable component, may then be thermoset by methods well known to the polyester resin art.

An important feature of this invention is the first step of providing a polycarboxylic acid component containing at least about 25 mole % and preferably at least about 50 mole % maleic acid, typically from reaction of maleic anhydride with water. This initial reaction is allowed to exotherm, and then the dicyclopentadiene is added and reacted. Reaction of the said polycarboxylic acid component with dicyclopentadiene at a temperature of about 90° C. to 150° C. is continued until a product is obtained containing at least 25 mole percent of the half maleic ester of dicyclopentyl alcohol and having the desired acid number of less than 250 and preferably less than about 225. The glycols are next added and reacted at elevated temperatures until the desired acid number, which should be less than about 55, preferably less than about 25, and the desired viscosity are reached.

The reaction of maleic anhydride and water proceeds with stoichiometric amounts of water. However, it is often desirable to include an excess amount of water.

Generally stated, the unsaturated polyester resin is made with 100 moles of a polycarboxylic acid component containing at least 25% by weight maleic acid; about 50 to about 200 and preferably about 60 to about 160 moles of dicyclopentadiene; and sufficient amounts of a glycol or polyol, usually about 25 to about 100 moles of polyol per 100 moles of polycarboxylic acid in the original reaction, to give desired final viscosity, preferably of at least about H at 30% xylene.

Polyesters of an average molecular weight of less than 1000 will normally be of a viscosity too low to impart to copolymer compositions the consistency required for satisfactory product formation. Polyesters of average molecular weight higher than about 2000, although capable of being copolymerized with vinyl monomers, are generally not desirable for use in the practice of the present invention, since such polyesters are difficult to manufacture and involve uneconomical reaction processing times of twenty hours and more at reaction temperature of about 200° C.

The curable liquid compositions contain about 40 to about 80 parts by weight of the aforesaid unsaturated polyester resin component and from about 20 to about 60 parts by weight, preferably from about 25 to about 50 parts by weight, of a monomeric copolymerizable component.

The unsaturated polyester resin may include, in addition to maleic acid (from maleic anhydride) other alpha,beta-unsaturated dicarboxylic acids such as fumaric acid, itaconic acid, citraconic acid, mesaconic acid and aconitic acid. A portion of the alpha,beta-unsaturated dicarboxylic acids may also be replaced with saturated dicarboxylic acids such as O-phthalic acid and isophthalic acids, tetrachlorophthalic acid, endomethylene-tetrahydrophthalic acid, adipic acid, chlorendic acid and sebacic acid, as well as dimerized linseed oil and soya oil, fatty acids or their anhydrides.

Dicyclopentadiene (DCPD) is usually incorporated as the commercial product described above. One may also use the commercially available "Cyclodiene Dimer Concentrate" sold by Exxon Chemicals and containing approximately 59% dicyclopentadiene, approximately 25% methyl dicyclopentadiene dimer and the remainder hydrocarbon materials. This mixture of DCPD and methyl DCPD dimer is less reactive than DCPD alone and cannot be used at equal concentration levels.

The polyhydric alcohols, preferably the dihydric alcohols in the unsaturated polyester are, for example, ethylene glycol; propanediol; 1,4-, 1,3-, or 2,3-butanediol; diethylene glycol; dipropylene glycol and the higher homologues; neopentylglycol; 2,2,4-trimethylpentanediol-1,3; oxalkylated bisphenols; hydrogenated bisphenol and cyclohexane dimethanol. The trihydric and polyhydric alcohols such as glycerine, trimethylolethane, trimethylolpropane, as well as pentaerythritol, may also be used conjointly with the preferred glycols if desired.

Further variations in the properties of the unsaturated polyester resins may be achieved by adding monofunctional compounds during the polycondensation, for example, by adding fatty acids having about 8 to about 22 carbon atoms, benzoic acid, resin acids, partially hydrogenated resin acid, such as abietic acid and/or dihydroabietic or tetrahydroabietic acids, monohydric n-alcohols having about 12 carbon atoms, benzyl alcohols and a resin alcohol such as abietyl alcohol.

The monomeric copolymerizable component in the compositions of this invention may be styrene, vinyl toluene, divinyl benzene, methyl acrylate, ethyl acrylate, n-butyl acrylate, 2-ethyl hexyl acrylate, methyl methacrylate, ethylene glycol dimethacrylate and its higher homologues, such as diethylene glycol dimethacrylate, trimethylolpropane trimethylacrylate, diallyl phthalate, diallyl maleate, diallyl fumarate, triallyl cyanurate, vinyl acetate and vinyl propionate. Styrene is preferred for technoeconomic reasons. Other available monomeric materials may be used if desired. The monomeric copolymerizable components may be used either separately or in various combinations as desired.

The amounts of vinyl monomers used for copolymerization are determined to some extent by the characteristics desired in the copolymer. In general, the higher the vinyl content the more brittle the copolymer, although this will vary in degree with the monomer used. Thus, at the same concentration, an ethyl acrylate copolymer is considerably more flexible than a styrene copolymer.

Polycondensation of the unsaturated polyester resin components may be carried out using conventional techniques until the mixture has an acid number of about 50 or less, preferably 2 to 40.

The esterification reaction should be sufficiently prolonged to insure the production of a polyester of desired molecular weight and desired viscosity. The extent of esterification is conveniently measured by acid number and viscosity determinations.

In order to ensure adequate storage stability for the curable liquid compositions of the invention, effective amounts of inhibitors may be added, such as hydroquinone, monotertiarybutyl-hydroquinone, benzoquinone, 1,4-naphthoquinone, 2,5-diphenyl-p-benzoquinone and p-tert butyl pyrocatechol and the like.

The polymerizable composition of the invention may contain, as further optional ingredients, fillers, catalyst, inhibitor and/or antioxidant, lubricant, thickening agent, dyestuffs and/or inorganic pigments and fiberglass.

Fibrous materials usefully added to the resinous system include materials typically used as reinforcing agents such as glass fabrics, chopped glass strands, chopped or continuous strand glass fiber mat, asbestos, cotton, synthetic organic fibers, metal fibers and the like. The glass containing reinforcing agents are preferred.

Various other additives may be included in the present resinous system such as colorants, pigments, mold release agents, lubricants, polymerization initiators and the like, as desired.

Curing of the resinous composition may be effected in a mold maintained at a temperature from about 212° F. to about 350° F., with pressures in the range from about 100 to about 1500 psi. Curing is effected within about 30 seconds up to about 5 minutes, depending upon the presence of optional additives, the thickness of the mass being molded and related variables well known to those skilled in the art.

Curing at ambient temperature may be effected using activator systems employed in conventional polyester resins for ambient temperature curing. These include systems such as benzoyl peroxide-dimethyl aniline, methyl ethyl ketone peroxide-cobalt octoate and the like.

The present invention is further illustrated by the following examples wherein all parts are given by weight (in grams) unless otherwise indicated. Regular polyester glassware equipment was used plus a water trap and a water cooled condenser on top of a short column. All reactions were conducted under nitrogen atmosphere.

EXAMPLE 1

| Ingredient | Parts by Weight (Grams) |
| --- | --- |
| Maleic Anhydride | 1441 |
| Water | 290 |
| Dicyclopentadiene | 2524 |
| Pentaerythritol | 200 |
| Propylene Glycol | 335 |
| MTBHQ (monotertiarybutyl-hydroquinone) | 0.22 |

Maleic anhydride and water were added to a glass flask and heated to about 55° C. The heat was turned off and the reaction allowed to exotherm to about 122° C. After the temperature started to drop, dicyclopentadiene was added and the reaction mixture heated slowly to 120° C. The heat was turned off, and at 125° C. cooling was started. The reaction was held at 130°–135° C. for 30 minutes. The reaction was heated slowly to 145° C. and held there until the acid number was less than 165 (about 1½ hours). Propylene glycol, pentaerythritol and the MTBHQ were added in that order. The pot temperature was raised to 210° C. over 2 to 3 hours, removing the water as it was formed and returning the dicyclopentadiene to the pot. After 210° C. was reached, everything that was distilled was removed. After one hour at 210° C. the sparge tube was added and nitrogen flow increased. After one hour sparging, the column was removed. After 8 hours at 210° C. the Gardner-Holdt viscosity was E-F (60 percent polyester in xylene) and the acid number of the solution was 7. The total weight of distillate was 293 grams, of which 240 grams was water and 53 grams was an organic liquid heavier than water. After cooling to 180°–190° C., 0.22 gram of MTBHQ was added. The resin was added to 2400 grams of styrene containing an additional 0.22 gram of MTBHQ. The resin was adjusted to a Gardner-Holdt viscosity of G-H with styrene and 0.25 percent of diethylene glycol and 1.0 percent of pyrogenic silica were added and mixed. Two percent styrene was added to give a 20 RPM Brookfield viscosity of 820 centipoises and 2 RPM Brookfield viscosity of 3000 centipoises for a 3.7 thixotropic index. The SPI gel time gave a 369° F. peak.

| | |
| --- | --- |
| Gel Time at 77° F. in presence of 0.1% Dimethyl Aniline, 0.2% of 12% Cobalt and 0.5% Lupersol DDM Catalyst | 7 min. |
| Interval (time from Gel to peak exotherm) | 18 min. |
| Peak, °F. | 261 |

The prepared product was found useful as a laminating resin.

EXAMPLE 2

The procedure of Example 1 was repeated with the following:

| Ingredient | Parts by Weight (Grams) |
| --- | --- |
| Maleic Anhydride | 999 |
| Phthalic Anhydride | 813 |
| Water | 310 |
| Dicyclopentadiene | 2071 |
| Propylene Glycol | 382 |
| Pentaerythritol | 235 |
| MTBHQ | 0.22 |

The reaction was run the same as Example 1. After dicyclopentadiene was added less cooling was required to hold the reaction at 130°–145° C. than in Example 1. The reaction was held at 145° C. until an acid number of less than 210 was reached. Thereafter the glycol, pentaerythritol and MTBHQ were added and the mixture was cooked at 210° C. to a Gardner-Holdt viscosity of G-H (60 percent polyester in xylene) and a solution acid number of 17. There were 320 ml. of distillate with 40 ml. of the heavier organic layer. After cooling to 190° C., 0.22 gram of MTBHQ was added to the resin. The resin was cut into 2400 grams of styrene containing an additional 0.22 gram MTBHQ. After adjusting to a Gardner-Holdt viscosity of G-H with styrene, 0.25 percent of diethylene glycol (DEG) and 1.0 percent pyrogenic silica were added based on the weight of thinned resin. The Brookfield viscosity at 20 RPM was 730 centipoises and at 2 RPM was 2500 centipoises for a thixotropic index. The SPI gel time gave a 334° F. peak.

| | |
| --- | --- |
| Gel Time at 77° F. in presence of 0.1% Dimethyl Aniline, 0.2% of 12% Cobalt and 0.5% Lupersol DDM Catalyst | 5 min. |
| Interval (time from Gel to peak exotherm) | 16 min. |
| Peak, °F. | 251 |

The prepared product was found useful as a laminating resin.

EXAMPLE 3

The procedure of Example 1 was repeated, except using the following:

| Ingredient | Parts by Weight (Grams) |
| --- | --- |
| Maleic Anhydride | 1621 |
| Water | 325 |
| Dicyclopentadiene | 2183 |
| Propylene Glycol | 628 |
| Pentaerythritol | 68 |
| MTBHQ | 0.22 |

The reaction was run the same as in Example 1. However, after dicyclopentadiene was added, cooling was started at once to control the exotherm at 130°–135° C. The reaction was held at 145° C. until an acid number of less than 225 was reached (about 1½ hours). After addition of the polyols and MTBHQ the mixture was cooked at 210° C. to a Gardner-Holdt I-J viscosity (60 percent polyester in xylene) and a solution acid number of 12. At 190° C., 0.22 gram of MTBHQ was added and the resin was then blended into 1900 grams of styrene containing an additional 0.22 gram MTBHQ. The product, containing 31.3 percent styrene, had a Gardner-Holdt viscosity of Y ½. The SPI gel time had a 400° F. exotherm. The prepared product was found useful as a molding resin.

EXAMPLE 4

The product of Example 1 was used to prepare a laminate according to the following formulation:

| Ingredient | Parts by Weight (Grams) |
| --- | --- |
| Product Example 1 | 384.00 |
| Styrene | 16.00 |
| 12% Cobalt Octoate | 0.40 |
| Dimethyl Aniline | 0.20 |

-continued

| Ingredient | Parts by Weight (Grams) |
|---|---|
| MTBHQ | 0.04 |
| Methyl Ethyl Ketone Peroxide (60%) | 4.00 |

The laminate was prepared using 3 ply of 1½ oz. fiberglass mat. It was cured 3 days at room temperature and one hour at 212° F. Average thickness of the laminate was 0.091 inches.

Physical properties at 72° F. are as follows:

| | |
|---|---|
| Tensile strength | 16,400 psi |
| Tensile modulus | 1.1 × 10⁶ psi |
| Flexural strength | 31,000 psi |
| Flexural modulus | 1.1 × 10⁶ psi |

EXAMPLE 5

| Ingredient | Parts by Weight (Grams) |
|---|---|
| Maleic Anhydride | 1282 |
| Water | 706 |
| Dicyclopentadiene | 2246 |
| Propylene Glycol | 258 |
| Pentaerythritol | 214 |
| MTBHQ | 0.22 |

In this procedure, extra water in the formulation reduces the reflux temperature and no exotherm is obtained. However, fast stirring was required to reduce foaming. Maleic anhydride and water were heated to 100° C. and thereafter dicyclopentadiene added. The reaction mixture was heated to 111° C. and refluxing started. The water was removed until a pot temperature of 145° C. was reached, and the dicyclopentadiene returned to the pot. After the temperature reached 145° C. the reaction procedure was completed in the same manner as described in Example 1.

EXAMPLE 6

A series of experiments were prepared by the procedure following except varying the types and parts by weight of reactants (in grams) as indicated in Table I. Maleic anhydride (MA) and water were weighed into a 5 liter flask and warmed until the maleic anhydride melted and reacted with the water. The heat was turned off and the reaction allowed to exotherm. When the temperature started to drop dicyclopentadiene (DCPD) was added and the reaction mixture heated at 140°–145° C. under total reflux for two hours. The acid number was 175 or less. The pentaerythritol (Penta) and/or propylene glycol (PG) or diethylene glycol (DEG) or sorbitol, as noted, were added and the temperature raised slowly to 210° C. with the water being removed as it formed. The reaction was run to a Gardner-Holdt viscosity of G-H (60 percent polyester in methyl cellosolve) and solution acid number of 10–15. MTBHQ inhibitor (0.20 grams) was added at 180° C. and the resin blended into styrene containing an additional 0.20 gram MTBHQ inhibitor. The amount of styrene added was that needed to provide a Gardner-Holdt viscosity of G-H. Pyrogenic silica (1.0 percent) and diethylene glycol (0.2 percent) were added and mixed for 5 minutes. This gave a Brookfield viscosity at 20 RPM of 750 to 900 centipoises and a thixotropic index of 3 to 4. In all cases, the amount of the percentage additives is based on the combined weight of styrene and the unsaturated polyester resin. In Table I, the control, designated as Run 6-6, was prepared from MA and phthalic anhydride (PA) using conventional techniques well known to the prior art.

TABLE I

DCPD LAMINATING RESINS

| Run | Parts by Wt. MA | Parts by Wt. Water | Parts by Wt. DCPD | Parts by Wt. PG | Parts by Wt. Penta | Styrene % Total @ G-H Vis. | Exotherm R.T.Gel (1) | Exotherm SPI Gel | Heat Distortion Temperature of ¼" Casting |
|---|---|---|---|---|---|---|---|---|---|
| 6-1 | 1229 | 248 | 2060 | 285 | 170 | 40 | 301° F. | 399° F. | — |
| 6-2 | 1203 | 243 | 2107 | 280 | 167 | 41.5 | 288° F. | 380° F. | 228° F. |
| 6-3 | 1176 | 238 | 2060 | 330 DEG | 196 | 40.4 | 273° F. | 365° F. | 198° F. |
| 6-4 | 1200 | 242 | 2101 | 279 | 178 Sorbitol | 45 | 286° F. | 367° F. | 230° F. |
| 6-5 | 1203 | 243 | 2107 | 280 | 167 | 41 | 288° F. | — | — |
| 6-6 (Control) | 557 MA 1961 PA | — | — | 1482 | — | 42 | 270° F. | 365° F. | 172° F. |

(1) 0.2% 12% Cobalt
0.05% DMA
0.5% DDM
at 77° F.

| Run | Flexural Strength PSI | Flexural Modulus PSI | Tensile Strength PSI |
|---|---|---|---|
| 6-6 (Control) | 28,000 | 1.26 × 10⁶ | 15,000 |
| 6-5 | 26,000 | 1.2 × 10⁶ | 12,600 |
| 6-2 | 28,000 | 1.2 × 10⁶ | — |
| 6-3 | 29,000 | 1.4 × 10⁶ | — |

In the following examples, the reactants are stated in terms of mole percent. Examples 7, 8 and 9 demonstrate the use of increasing ratios of DCPD to carboxylic acid; Examples 10 and 11 employ temperature variation in the first and second steps, respectively; Examples 12 and 13 illustrate the use of phthalic acid and adipic acid, respectively.

EXAMPLE 7

| Formulation | Mole % | | Wgt. % | Charge |
|---|---|---|---|---|
| | 100 | MA | 26.65 | 1199 |
| Step I | 105 | Water | 5.14 | 231 |
| | 160 | DCPD | 57.44 | 2584 |
| Step II | 20 | Ethylene glycol (EG) | 3.37 | 152 |
| | 20 | Penta | 7.40 | 333 |

| Formulation | Mole % | | Wgt. % | Charge |
|---|---|---|---|---|
| | | -continued | | |
| | | Hydroquinone | .01 | .5 |

Step I

The 5-liter flask was equipped with a stirrer, nitrogen inlet tube, thermometer and distillation column. The DCPD and water were added to the flask followed by molten MA. The reaction was allowed to exotherm to about 125° C. and cooling was applied. The reaction was held at 130°–135° C. for 4 hours until an acid number of 153 was reached.

Step II

The ethylene glycol, pentaerythritol (Penta) and hydroquinone were added to the flask and slowly heated to 210° C. removing water and some organic material from the reaction. After about 2 hours at 210° C., a sparge tube was added and the nitrogen rate increased. After 18 to 20 hours at 210° C., the Gardner-Holdt Viscosity was G at 40% xylene and the acid number was 5. Monotertiarybutyl-hydroquinone (0.38 grams) was added to the resin and blended into 2000 grams of styrene containing 0.38 grams MTBHQ. The product contained 36.2% styrene and had a viscosity at 77° F. of 460 cps.

EXAMPLE 8

| Formulation | Mole % | | Wgt. % | Charge |
|---|---|---|---|---|
| | 100 | MA | 24.79 | 1116 |
| Step I | 105 | Water | 4.78 | 215 |
| | 180 | DCPD | 60.11 | 2705 |
| | 30 | Penta | 10.32 | 464 |
| Step II | | Hydroquinone | .013 | .6 |

Step I

The molten MA was added to the DCPD and water using equipment the same as Example 7 and allowed to slowly exotherm to 120° C. The reaction was held at 120° C. for 8 hours until an acid number of 120 was reached.

Step II

The pentaerythritol (Penta) and hydroquinone were added and heated slowly to 210° C. Water and some organic materials were removed. After 2 hours at 210° C., a sparge tube was added and the nitrogen rate increased. After 4 hours at 210° C., the Gardner-Holdt Viscosity was F at 40% xylene and an acid number of 53. Hydroquinone (0.25 grams) was added to the resin and blended into 2000 grams of styrene containing 0.25 grams of hydroquinone.

EXAMPLE 9

| Formulation | Mole % | | Wgt. % | Charge |
|---|---|---|---|---|
| | 100 | MA | 21.78 | 653 |
| Step I | 200 | DCPD | 58.67 | 1760 |
| | 300 | Water | 12.00 | 360 |
| | 25 | Penta | 7.56 | 227 |
| Step II | | Hydroquinone | .005 | 0.15 |

Step I

A 5-liter flask containing a stirrer, gas inlet tube, thermometer, addition funnel and column was added. The MA and DCPD were added to the flask and warmed to 80°–100° C. The water was slowly added and the temperature went up to 125° C. and slowly fell to 103°–107° C. as water was added. The reaction was held under reflux at 103°–107° C. for 2½ hours. Then water was slowly removed returning the DCPD to the pot until a pot temperature of 140° C. was reached. The reaction was held at 140° C. for 1 hour and at this time the acid number was 107.

Step II

The pentaerythritol (Penta) and hydroquinone were added and slowly heated to 215° C. removing water and some organic material.

After 2 hours at 215° C., a sparge tube was added and the nitrogen rate increased. After about 8 hours at 215° C., the Gardner-Holdt Viscosity was F ½ at 40% xylene and the acid number was 10. Hydroquinone (0.06 grams) was added to the resin and blended into 1000 grams of styrene containing 0.06 grams of hydroquinone.

A laminate was prepared from 225 grams of resin (1100 cps. at 77° F., 31.3% styrene), 25 grams of styrene, 2.5 grams of dimethylaniline and 5 grams of benzoyl peroxide, using 3 plies of 1½ oz. glass. After curing for 3 days at room temperature, it had a Barcol hardness of 35–43. After curing 4 hours at 100° C., the Barcol was 40–43. The glass-free resin along the edge of the laminate was hard and brittle.

EXAMPLE 10

| Formulation | Mole % | | Wgt. % | Charge |
|---|---|---|---|---|
| | 100 | MA | 31.94 | 1437 |
| Step I | 116 | DCPD | 50.00 | 2250 |
| | 101 | Water | 5.94 | 267 |
| Step II | 60 | EG | 12.12 | 545 |
| | | Hydroquinone | .025 | 1.1 |

Step I

The water and MA were added to the flask (same equipment as Example 7) and warmed to melt the MA. The reaction exotherm was cooled to 85° to 95° C. and the DCPD added slowly with cooling, keeping the temperature below 95° C. The reaction was held at 90° C. for 6 hours until an acid number of 183 was reached.

Step II

The EG and hydroquinone were added and heated slowly to 215° C. removing water and some organic material. After 2 hours at 215° C., a sparge tube was added and the nitrogen rate increased. After 14 hours at 215° C., the viscosity was F ½ at 40% xylene and the acid number was 10. Hydroquinone (0.25 grams) was added to the resin and blended into 2000 grams of styrene containing 0.25 grams of hydroquinone.

EXAMPLE 11

| Formulation | Mole % | | Wgt. % | Charge |
|---|---|---|---|---|
| Step I | 50 | MA | 16.36 | 736 |
| | 50 | PA | 24.71 | 1112 |

| Formulation | Mole % | | Wgt. % | Charge |
|---|---|---|---|---|
| | 105 | Water | 6.31 | 284 |
| | 80 | DCPD | 35.26 | 1587 |
| | 40 | EG | 8.28 | 373 |
| Step II | 20 | Penta | 9.08 | 408 |
| | | Hydroquinone | 0.01 | 0.05 |

Step I

The DCPD, water, MA and PA were added to the flask (same equipment as Example 7) and slowly warmed to 130°–140° C. The flask was cooled slightly at 125°–135° C. to control a slight exotherm. The reaction was held at 130°–140° C. for 8 hours until an acid number of 240 was obtained.

Step II

The EG, pentaerythritol (Penta), hydroquinone and about 5% of toluene were added. A water trap was added on top of the column. The reaction was slowly heated to 180° C. using a toluene azeotrope to remove the water. Toluene was added from time to time to keep the reaction refluxing at 180° C. After 12 hours the viscosity was F in 40% xylene and the acid number was 30.

MTBHQ (0.5 grams) was added to the resin and blended into 2000 grams of styrene containing 0.5 grams of MTBHQ.

EXAMPLE 12

| Formulation | Mole % | | Wgt. % | Charge |
|---|---|---|---|---|
| | 30 | MA | 8.74 | 262 |
| Step I | 70 | PA | 30.80 | 924 |
| | 70 | DCPD | 27.47 | 824 |
| | 300 | Water | 16.05 | 482 |
| Step II | 70 | EG | 12.90 | 387 |
| | 10 | Penta | 4.04 | 121 |
| | | Hydroquinone | .005 | 0.15 |

Step I

The MA, PA and DCPD were placed into a 4-liter resin flask containing a stirrer, gas inlet tube, addition funnel, thermometer and water trap. The material was heated to 90°–100° C. and the water slowly added and held under reflux for one hour. Then the water was slowly removed using the water trap and returning the DCPD to the flask until the pot temperature was 135° C. The reaction was held at 135° C. for 5 hours. The phthalic acid was not completely soluble in the reaction and formed a thick slurry.

Step II

The EG, pentaerythritol (Penta) and hydroquinone were added to the flask and slowly heated to 215° C. removing the water and some organic material. After two hours, a sparge tube was added and the nitrogen rate increased. After 4 hours, the Gardner-Holdt Viscosity was F ½ at 40% xylene and the acid number was 20.

Hydroquinone (0.15 grams) was added and the resin blended into 1000 grams of styrene containing 0.15 grams of hydroquinone.

EXAMPLE 13

| Formulation | Mole % | | Wgt. % | Charge |
|---|---|---|---|---|
| | 75 | AA | 39.11 | 1564 |
| Step I | 25 | MA | 8.75 | 350 |
| | 50 | Water | 3.21 | 128 |
| | 70 | DCPD | 33.00 | 1320 |
| | 50 | EG | 11.07 | 443 |
| Step II | 10 | Penta | 4.86 | 194 |
| | | Hydroquinone | 0.013 | 0.5 |

Step I

All the reactants were added to the flask (same equipment as Example 7) and heated slowly to 130° C. and held there for 8 hours until an acid number of 374.

Step II

The EG, pentaerythritol (Penta) and hydroquinone were added and cooked at 215° C. for 8 hours until a Gardner-Holdt Viscosity of H at 30% xylene and an acid number of 41. Hydroquinone (0.25 grams) was added to the resin and blended into 1600 grams of styrene containing 0.25 grams of hydroquinone.

All the products in the above examples formed hard or tough material when co-polymerized with styrene.

It is understood that the foregoing detailed description is given merely by way of illustration and that many variations may be made therein without departing from the spirit of this invention.

I claim:

1. Method for preparing an unsaturated polyester comprising the steps of:
   (a) reacting about 100 moles of a polycarboxylic acid component containing at least about 25 moles maleic acid with about 50 to about 200 moles of dicyclopentadiene at a temperature of about 90° C. to about 150° C. for a sufficient period of time to provide a reaction product comprising at least 25 mole % half maleic ester of dicyclopentyl alcohol;
   (b) further reacting the reaction product of step (a) with about 25 to about 100 moles of a polyol or mixture of polyols per 100 moles of polycarboxylic acid in step (a), at a temperature of at least about 180° C. until the acid number of the resultant unsaturated polyester is less than about 55, and
   (c) blending about 80 to about 40 parts by weight of the reaction product of step (b) with about 20 to about 60 parts by weight of a monomeric copolymerizable component.

2. A curable liquid composition produced according to the method of claim 1.

3. A composition according to claim 2 wherein the monomeric copolymerizable component is styrene.

4. A cured product produced from a composition according to claim 3.

5. Method for preparing an unsaturated polyester comprising the steps of:
   (a) reacting about 100 moles of a polycarboxylic acid component containing at least about 25 moles maleic acid with about 50 to about 200 moles of dicyclopentadiene at a temperature of about 90° C. to about 150° C. for a sufficient period of time to provide a reaction product comprising at least 25 mole % half maleic ester of dicyclopentyl alcohol;
   (b) further reacting the reaction product of step (a) with about 25 to about 100 moles of a polyol or mixture of polyols per 100 moles of polycarboxylic acid in step (a), at a temperature of at least about 180° C. until the acid number of the resultant unsaturated polyester is less than about 55, and (c) blending about 75 to about 50 parts by weight of the reaction product of step (b) with about 25 to about 50 parts by weight of a monomeric copolymerizable component.

6. Method according to claim 5 wherein the polycarboxylic acid component contains at least about 50 moles maleic acid.

7. Method according to claim 6 wherein the polycarboxylic acid component contains at least 50 moles maleic acid and is reacted with about 60 to about 160 moles dicyclopentadiene and the reaction product of step (a) has an acid number less than about 250 and contains at least about 45 moles of the half maleic ester of dicyclopentyl alcohol.

8. Method of claim 7 wherein the resultant unsaturated polyester has a Gardner-Holdt Viscosity of at least about H at 30% xylene.

* * * * *

UNITED STATES PATENT AND TRADEMARK OFFICE
CERTIFICATE OF CORRECTION

PATENT NO. : 4,246,367
DATED : 1/20/81
INVENTOR(S) : Omer E. Curtis, Jr.

It is certified that error appears in the above-identified patent and that said Letters Patent are hereby corrected as shown below:

Column 8, after TABLE I and before line 45, insert the following: --

TABLE II

Physical Properties

1/8 inch laminates were prepared from 1 layer of glass cloth, 2 layers 1 1/2 oz. glass mat and top layer of glass cloth. The laminates were cured overnight at room temperature and one hour at 248°F. --.

Signed and Sealed this

Fourteenth Day of July 1981

[SEAL]

Attest:

GERALD J. MOSSINGHOFF

Attesting Officer     Commissioner of Patents and Trademarks